United States Patent [19]

Cardenas-Franco

[11] Patent Number: 4,783,746

[45] Date of Patent: Nov. 8, 1988

[54] METHOD AND APPARATUS FOR OPTIMIZING THE VELOCITY OF MECHANISMS AND CYCLE TIME IN GLASSWARE FORMING MACHINES

[75] Inventor: Luis Cardenas-Franco, Monterrey, Mexico

[73] Assignee: Vitro Tec Fideicomiso, Monterrey, Mexico

[21] Appl. No.: 888,948

[22] Filed: Jul. 23, 1986

[51] Int. Cl.⁴ ............................................. C03B 9/40
[52] U.S. Cl. ..................................... 364/473; 65/160; 65/163; 364/476
[58] Field of Search ................... 364/473, 476; 65/163, 65/160, 29

[56] References Cited

U.S. PATENT DOCUMENTS

| | | | |
|---|---|---|---|
| Re. 30,998 | 7/1982 | Peters | 364/473 |
| 4,007,028 | 2/1977 | Bublitz et al. | 364/473 |
| 4,338,116 | 7/1982 | Huff et al. | 364/473 |
| 4,369,052 | 1/1983 | Hotmer | 364/473 |
| 4,409,013 | 10/1983 | Cardenas et al. | 65/163 |
| 4,427,431 | 1/1984 | Mumford et al. | 364/473 |
| 4,615,723 | 10/1986 | Rodriguez-Fernandez et al. | 65/163 |
| 4,623,375 | 11/1986 | Cardenas-Franco et al. | 65/163 |

Primary Examiner—Jerry Smith
Attorney, Agent, or Firm—Abelman Frayne Rezac & Schwab

[57] ABSTRACT

In glassware article forming machines such as the well known I.S. machine, sensors continuously detect the velocity of operation of each individual mechanism of the machine in order to derive a signal for each mechanism representative of the actual velocity of operation of the associated mechanism, and a control receives the signal and compares the detected actual velocity of the mechanism with a predetermined maximum optium velocity for the mechanism to provide a signal compensating for deviations from the determined maximum velocity for that mechanism, and a command signal to trigger the operation of a succeeding mechanism of a glass forming sequence, when the preceeding mechanism has reached to its point of cushioning, thereby optimizing in this way both the velocity of each individual mechanism, and, the total time of a glassware article forming cycle of the machine.

6 Claims, 4 Drawing Sheets ically through a working cycle of the I.S. machine, this patent provides the feasibility to attain optimum

METHOD AND APPARATUS FOR OPTIMIZING THE VELOCITY OF MECHANISMS AND CYCLE TIME IN GLASSWARE FORMING MACHINES

FIELD OF THE INVENTION

This invention relates to glassware article forming machines such as those known as I.S. machines, and more specifically relates to a method and to an apparatus for optimizing the velocity of operation of each individual mechanisms of the machine in a cycle of formation of a glassware article, in order to allow production at high velocities.

BACKGROUND OF THE INVENTION

Glassware articles such as botles are commonly produced in a well known I.S. glassware forming machine, wherein a number of consecutuve individual forming mechanisms perform a number of sequenced forming steps in the processing of a molten glass gob, and in a predetermined forming cycle, to product the desired glassware article.

High production rates require good performance of each of the individual mechanism constituting the machine, in order to achieve a forming cycle corresponding to said high production rates.

The most relevant prior art to achieve good performance of the forming machine is represented by the U.S. Pat. No. 4,338,116 of Huff et al., wherein a first and a second sensor are provided for two consecutive mechanism of the machine, to provide input and output signals representative of the operation of mechanisms. Sensors are also provided to provide a signal representative of the dead time between operation of said mechanisms. In this manner maximization of throughput of an individual forming mechanism is accomplished, by detecting dead time during which individual forming mechanisms are at a standstill, and by then deciding how such motionless moments can be eliminated.

While said patent provides the possiblity of elimination of dead time between the operation of two consecutive mechanisms, it does not take into consideration that a particular one of the mechanisms may have been delayed in its operation due to incorrent functioning of that mechanism during the operation of the machine. This impedes the optimization of the time cycle of the machines and consequently the achievement of higher production rates.

SUMMARY OF THE INVENTION

It is therefore an object of the present invention, to provide a method and apparatus for optimizing the velocity of operation of individual mechanisms of a glassware forming machine, by correcting the performance velocity of each individual mechanism when it deviates from the maximum optimum velocity predetermined therefor.

It is also an object of the present invention, to provide a method and apparatus for optimizing the velocity of operation of a glassware forming machine, by triggering the operation of a succeeding mechanism of the forming sequence, at the time the preceeding mechanism reaches the point of cushioning, at which time its velocity is gradually diminished to avoid knocking of its components.

The present invention provides the feasibility to correct the velocity of operation of each individual mechanism when it is out of the pre-programmed maximum velocity of operation. Furthermore, instead of detecting the dead time in the operation of successive mechanisms, it provides the feasibility to trigger the operation of the following mechanism of the forming sequence in advance, when the former mechanism is in its point of cushioning, thus optimizing time in a forming cycle, instead of compensating for dead times.

BRIEF DESCRIPTION OF THE DRAWINGS

These and other objects and advantages of the present invention will be evident to those persons skilled in the art, from the following description of this invention, as related to the accompanying drawings, in which.

DETAILED DESCRIPTION OF THE INVENTION

The invention will be described with reference to the accompanying drawings.

Figure 1:
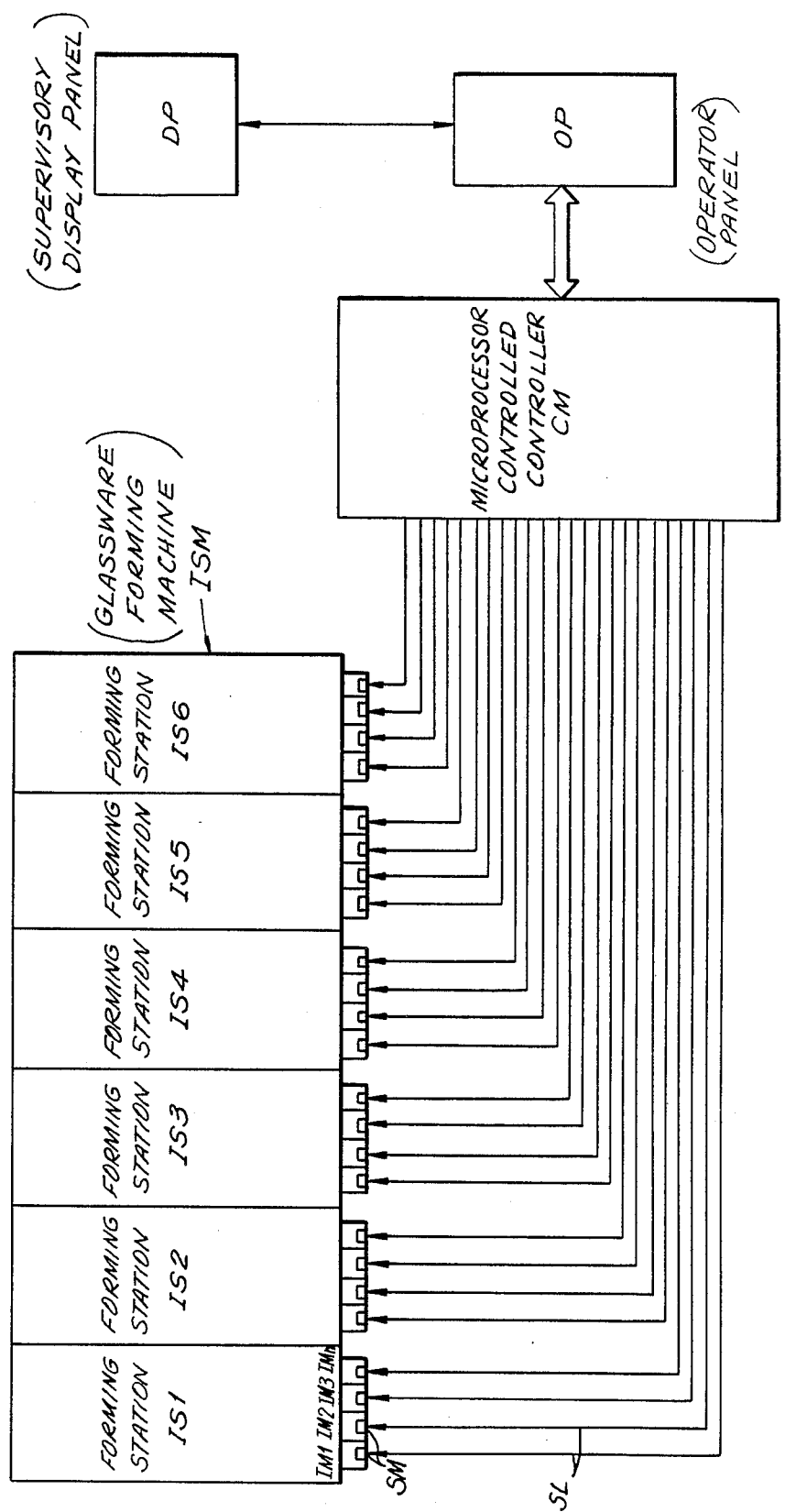
FIG. 1 is a block diagram representing a glassware article forming machine, known as I.S. machine, incorporating the apparatus of the present invention.
Figure 3:
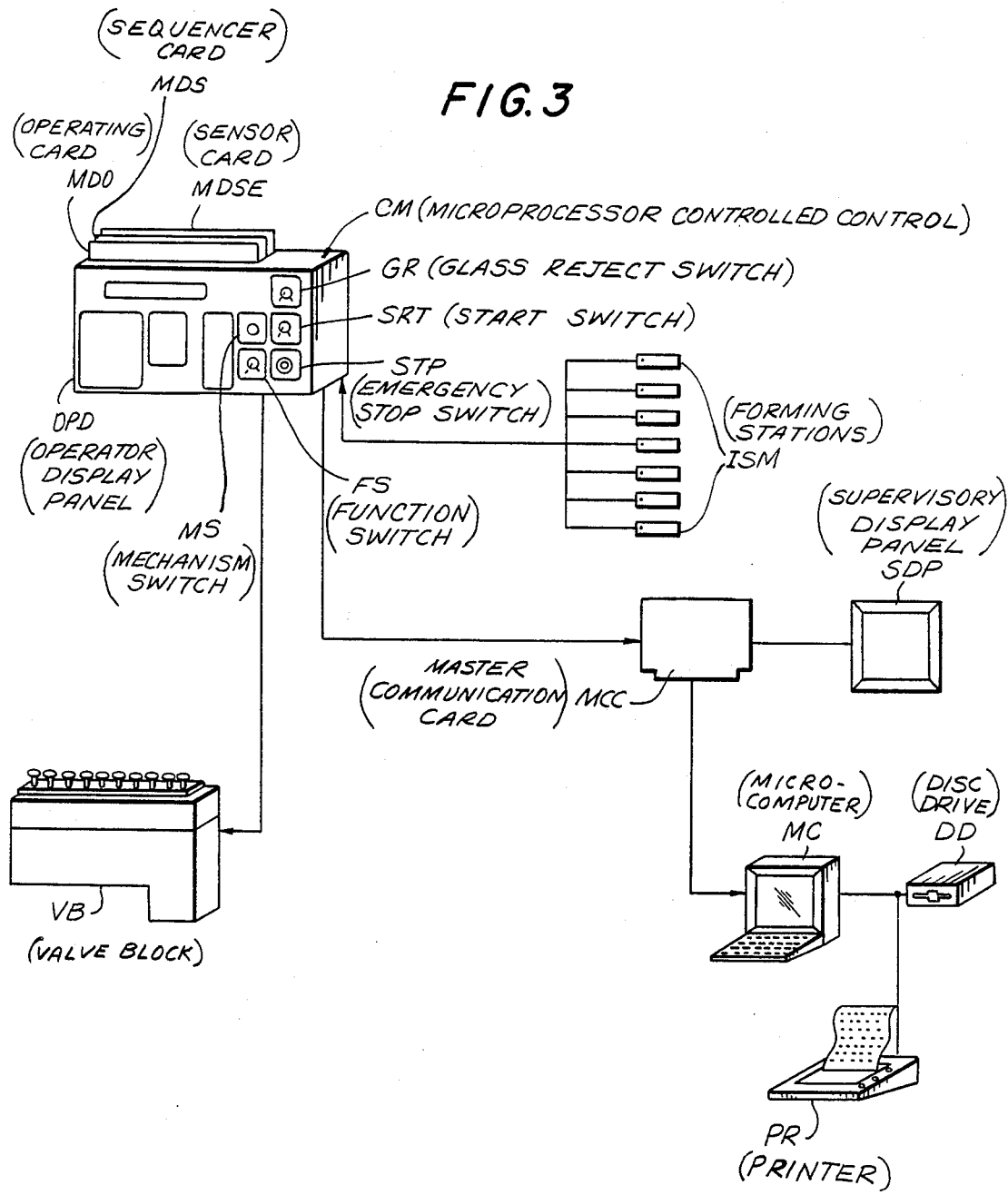
FIG. 3 is a diagram of the hardware employed in the apparatus of the present invention.

Referring to FIGS. 1 and 3, and I.S. machine indicated generally as ISM, comprises a plurality of individual forming sections IS1 to IS6, each of which includes a plurality of individual feeding, forming and handling mechanisms, indicated at IM1, IM2, ... IMn. The individual mechanisms include the tube and piston of the forehearth, the gob cutting knives the gob distributor, the funnel and blow head, the mold operation, take out and push out mechanisms, etc. These are generally driven by pneumatic cylinder and piston assemblies (not illustrated).

The apparatus for optimizing the velocity of operation of said individual mechanisms IM1, IM2, ... IMn of said I.S. machine ISM, in accordance with the present invention, comprises sensor means SM, such as velocity, pressure or position sensors, which are coupled to each of said individual mechanisms IM1, IM2 . . . IMn, to provide a signal representative of the actual velocity of operation of the associated mechanism through signal lines SL (FIG. 1).

Control means CM such as a microprocessor MC, receives the signals representative of actual the velocity of operation of the respective mechanisms, and compares them with a table of predetermined maximum optimum velocity for the respective mechanisms.

The output of the controller CM is fed to a master supervisory panel DP through an operator panel OP, in order to provide signals compensating for the differences between the actual velocity of the mechanisms and the maximum optimum velocity predetermined therefor. The signals are fed via the lines SL to actuating means of the respective mechanisms, the signals providing velocity adjustment commands to a valve block VB (FIG. 3).

Additionally, a command signal is supplied to an actuating means of a succeeding mechanism when the preceeding mechanism reaches its point of cushioning and velocity is gradually diminishing, in order to trigger the operation of said succeeding mechanism of the forming cycle, allowing in this way to increase the production rate.

Further, with reference to FIG. 3, the control means CM may be a microprocessor controlled by an operating card MDO, a sequencer card MDS and a sensor card MDSE to adapt the input and output signals thereto, and which include memories including tables of the maximum velocity of operation for several types of glassware articles to be fabricated. The operator panel may be designed to receive and provide information to said microprocessor, comprising a glass reject switch GR, a start switch SRT, an emergency stop switch STP, mechanism switches MS and function switches FS. The microprocessor MC also receives pressure or proximity signals of the point of cushioning of the respective forming mechanisms, i.e., the moment at which an associated mechanism is decelerating its momentum.

It will be understood that there are sensor means SM (FIG. 1) for each forming mechanism of the glassware forming machine, and that the control means CM is provided with signals representative of the sequence of operation of each one of the respective mechanisms of the machine.

Compensation for differences between the actual and the predetermined maximum optimum velocities of operation of the mechanisms may be automatic or semi-automatic.

In the semi-automatic mode, the control means CM, through its master supervisory panel which comprises a master communication card MCC, a supervisory display panel SDP, and a microcomputer MC with its corresponding disk drives DD and printer PR (FIG. 3), informs the operator of any difference between the actual and predetermined velocities of the mechanisms in order that the operator can manipulate the operation and bring it to predetermined maximum velocity.

The operation of the succeeding mechanism of the sequence is triggered in an advanced and linked way by the operation of the preceeding mechanism, taking into consideration deviations from the predetermined maximum velocity signal.

Data fed to the control means CM in the fabrication of an specific article of glassware and which is representative of physical characteristics thereof includes: neck ring forming time; parison forming time; reheating time; stretching time; parison blowing time; final blowing time; etc.

The profile pressure of blowing in the parison formation and final formation are controlled by a pneumatic servo valve.

The control means CM equates the blowing pressures and, in accordance with a four parameter visco-elastic model, calculated the velocities of the mechanisms and automatically modifies said velocities in order to optimize them, and as a consequence optimize the whole forming cycle of the glassware.

Figure 2:
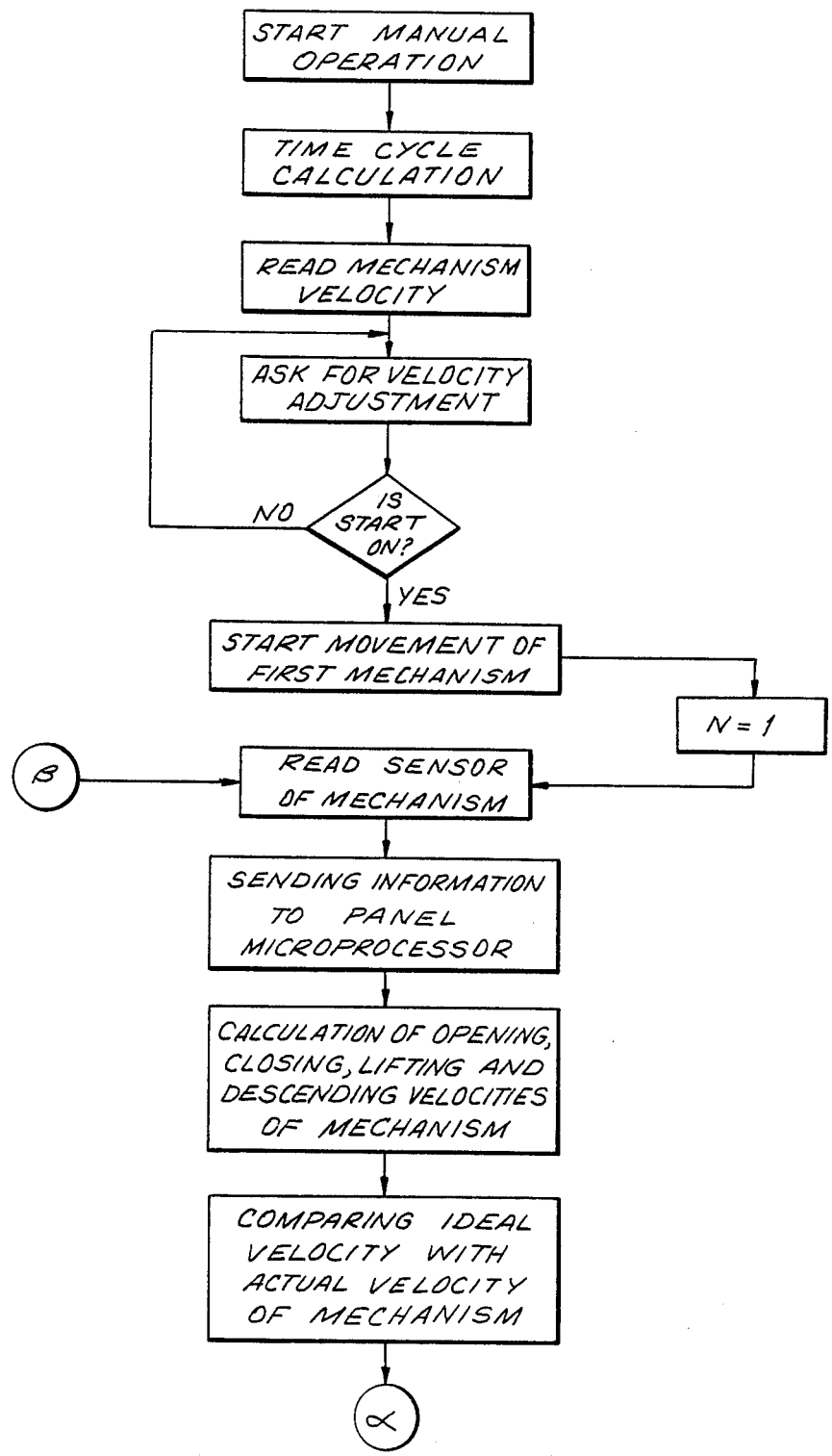
FIGS. 2 and 2A are flow diagrams of the logic operation of the apparatus of the present invention.
Figure 2A:
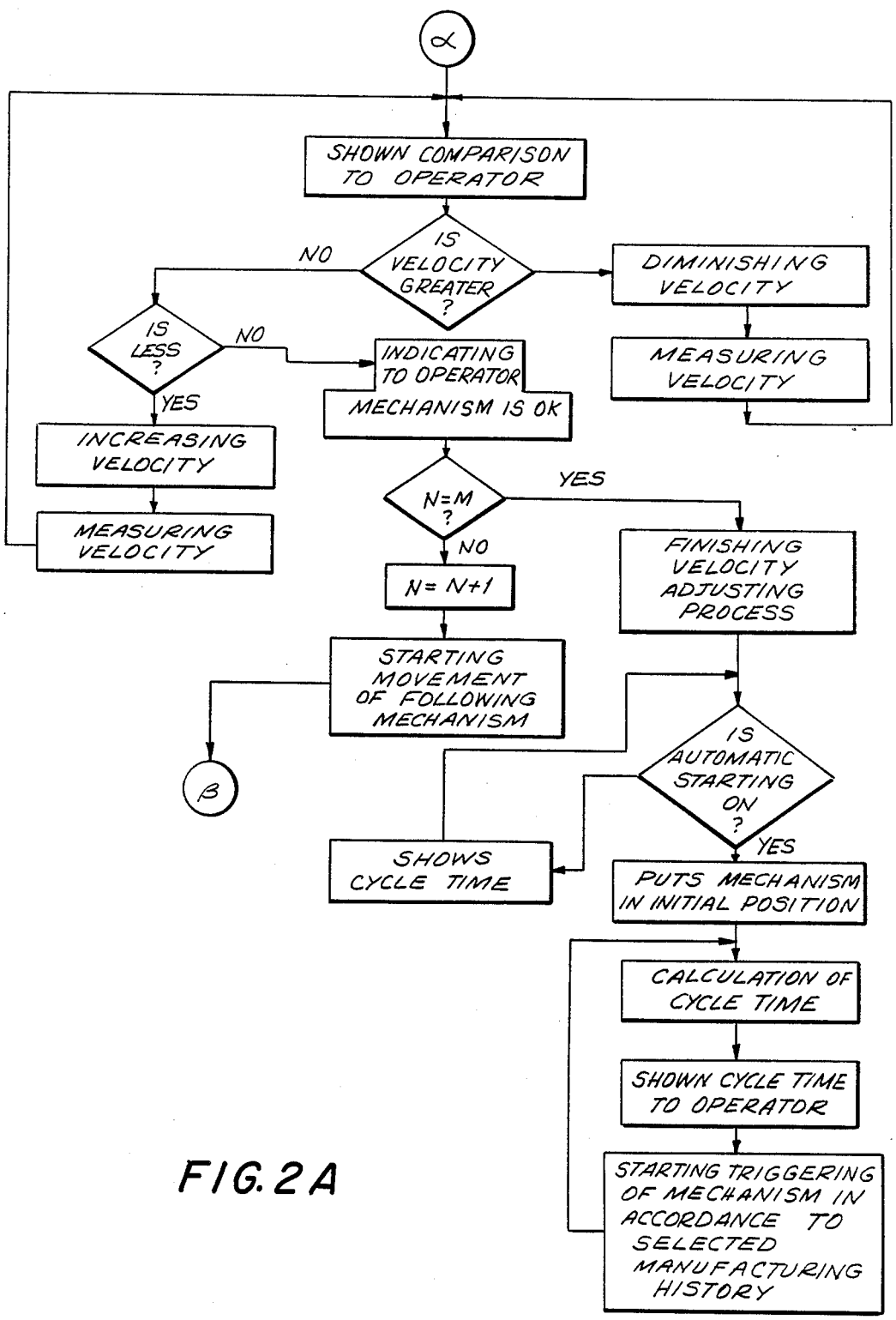

The logic operation of both the method and the apparatus is shown in FIG. 2, and will be now described in combination with FIG. 3. This includes:

Starting the manual operation through the operation panel start switch SRT and calculating the cycle time for each mechanism in the MDO card;

reading the velocity of each mechanism in the MDSE card in a predetermined sequence, asking for velocity adjustments and, if starting is not on, then return to ask for velocity adjustment in the MDS card;

if starting is on, then initiating movement of the first mechanism of the sequence wherein N=1;

the sensors S read the data of the corresponding mechanism and send said information to the microprocessor panel SDP;

the microprocessor CM calculates the closing, opening, lifting and descending velocities of the corresponding mechanism and compares the actual velocity against the ideal velocity of said mechanism in the MDS card, and shows said comparison to the operator at the operator panel display OPD;

if the actual velocity is greater than the ideal, when the velocity is dimished and the new actual velocity is again read and fed back to the operator display panel;

if the actual velocity is not greater than optimum, then it could be less than optimum, at which point the velocity is increased, and the new actual velocity is again read and fed back to the operator display panel;

if the actual velocity is not less than optimum, this indicates the operator that the mechanism is OK;

then if N=M where M is optimum velocity, then N must be N+1 starting from the movement of the succeeding mechanism by following the same routine from the step wherein sensors read the data, as shown by B;

but if N=M then the velocity adjustment process is finished;

if automatic starting is not ON the control then shows cycle time and checks again if automatic starting is ON;

if the automatic starting is ON then the mechanisms are placed in initial position, the time cycle is again calculated and shown to the operator, and triggering of mechanisms is initiated in accordance with the history of the selected article of manufacture based on the calculated cycle time.

I claim:

1. In a glassware article forming machine of the type including a plurality of individual feeding, forming and handling mechanisms for molten glass gobs, an apparatus for optimizing the velocity of operation of each individual mechanism and optimizing the forming cycle of the machine, comprising:

sensor means for each of the individual mechanisms of the machine, and operative to drive signals representative of the actual velocity of operation of said mechanisms; and control means connected to said sensor means, and operative to receive and compare said signals with a predetermined maximum optimum velocity memory for said respective mechanisms, in order to provide a signal for compensating for deviations of the velocity of any one of said mechanisms from said predetermined maximum optimum velocity for said mechanism, and to provide a command signal to trigger the operation of a succeeding mechanism when the preceeding mechanism has reached its point of cushioning, whereby the velocity of operation of each individual mechanism of the machine, and the glassware forming cycle of the machine is optimized.

2. The apparatus of claim 1, wherein said control means comprises a microcomputer having interfaces to adapt the input and output signals thereto, a memory including tables of the maximum optimum velocity of operation of each mechanism of said machine for several types of glassware articles to be produced, and an operator panel to receive and provide information from and to the microcomputer.

3. The apparatus of claim 1, wherein the sensor means comprise velocity, position and pressure sensors for each individual mechanism of said machine.

4. The appratus of claim 1, wherein said compensation for deviations of the velocity of any one of said mechanisms from said predetermined maximum optimum velocity of operation is carried out automatically.

5. The apparatus of claim 1, wherein said compensation for deviations of the velocity of any one of said mechanisms from said predetermined maximum optimum velocity of operation is carried out semi-automatically.

6. A method for optimizing the velocity of operation of individual mechanisms and the forming cycle of said mechanisms in a glassware article forming machine, comprising:

sensing the actual velocity of operation of each individual mechanism of the machine;

comparing by means of a data processor said sensed actual velocity with a predetermined maximum optimum velocity for said mechanism;

deriving from said data processor a compensating signal for each mechanism representing a difference between the actual velocity and the predetermined maximum optimum velocity for said mechanism; and, deriving a command signal for triggering a succeeding mechanism of the forming sequence from a preceeding mechanism that has reached a point a deceleration.

* * * * *